(12) United States Patent
Kapoor

(10) Patent No.: US 9,404,623 B2
(45) Date of Patent: Aug. 2, 2016

(54) MODULAR COMPRESSED NATURAL GAS SYSTEM FOR USE AT A WELLSITE

(71) Applicant: General Electric Company, Schenectady, NY (US)

(72) Inventor: Manik Kapoor, Houston, TX (US)

(73) Assignee: General Electric Company, Schenectady, NY (US)

( * ) Notice: Subject to any disclaimer, the term of this patent is extended or adjusted under 35 U.S.C. 154(b) by 151 days.

(21) Appl. No.: 14/189,492

(22) Filed: Feb. 25, 2014

(65) Prior Publication Data

US 2015/0240996 A1 Aug. 27, 2015

(51) Int. Cl.
*F17C 13/08* (2006.01)
*F17C 13/00* (2006.01)
(Continued)

(52) U.S. Cl.
CPC ............... *F17C 13/083* (2013.01); *F17C 1/00* (2013.01); *F17C 5/06* (2013.01); *F17C 13/002* (2013.01); *F17C 2201/0109* (2013.01); *F17C 2201/035* (2013.01); *F17C 2201/054* (2013.01); *F17C 2201/056* (2013.01); *F17C 2205/0111* (2013.01); *F17C 2205/0142* (2013.01); *F17C 2205/0184* (2013.01); *F17C 2205/0326* (2013.01); *F17C 2205/0329* (2013.01); *F17C 2205/0341* (2013.01); *F17C 2205/0376* (2013.01); *F17C 2221/011* (2013.01); *F17C 2221/012* (2013.01); *F17C 2221/014* (2013.01); *F17C 2221/033* (2013.01); *F17C 2221/035* (2013.01); *F17C 2223/0123* (2013.01); *F17C 2223/035* (2013.01); *F17C 2223/036* (2013.01); *F17C 2225/0123* (2013.01); *F17C 2225/035* (2013.01); *F17C 2225/036* (2013.01); *F17C 2227/0157* (2013.01); *F17C 2227/0164* (2013.01); *F17C 2227/0185* (2013.01);
(Continued)

(58) Field of Classification Search
CPC ........ F17C 13/083; F17C 1/00; F17C 13/002; F17C 2227/0157; F17C 2227/04
USPC ....................................... 137/1, 351
See application file for complete search history.

(56) References Cited

U.S. PATENT DOCUMENTS 4,139,019 A 2/1979 Bresie et al.
4,522,159 A 6/1985 Engel et al.
(Continued)

OTHER PUBLICATIONS

PCT Search Report and Written Opinion issued in connection with corresponding PCT Application No. PCT/US2015/017411 on Aug. 12, 2015.

*Primary Examiner* — Kevin Lee
(74) *Attorney, Agent, or Firm* — Bracewell LLP; Taylor P. Evans

(57) ABSTRACT

A system and method of receiving field gas from a compressor station pipeline, and compressing the gas at a remote location with a modular compressor. The compressed gas is collected in a container and transported to a wellsite for use at the wellsite. The gas from the pipeline is directed to the container, and diverted to the modular compressor when pressure in the container approaches pressure in the pipeline. The modular compressor discharge is piped to the container, so that the container is filled with additional gas and at the discharge pressure of the modular compressor.

17 Claims, 13 Drawing Sheets

(51) Int. Cl.
*F17C 1/00* (2006.01)
*F17C 5/06* (2006.01)

(52) U.S. Cl.
CPC ....... *F17C 2227/04* (2013.01); *F17C 2250/032* (2013.01); *F17C 2250/034* (2013.01); *F17C 2250/043* (2013.01); *F17C 2250/0439* (2013.01); *F17C 2260/00* (2013.01); *F17C 2265/06* (2013.01); *F17C 2265/061* (2013.01); *F17C 2265/065* (2013.01); *F17C 2270/0168* (2013.01); *F17C 2270/0171* (2013.01); *F17C2270/0173* (2013.01); *Y02E 60/321* (2013.01); *Y10T 137/0396* (2015.04); *Y10T 137/6914* (2015.04); *Y10T 137/86035* (2015.04)

(56) References Cited

U.S. PATENT DOCUMENTS

| | | |
|---|---|---|
| 4,531,558 A | 7/1985 | Engel et al. |
| 6,732,769 B2 | 5/2004 | Del Campo |
| 2006/0156742 A1* | 7/2006 | Farese ........................ F17C 5/06 62/50.2 |
| 2007/0221382 A1 | 9/2007 | Schimp |
| 2013/0232916 A1* | 9/2013 | Utal ........................ F17C 5/007 53/403 |
| 2013/0233388 A1* | 9/2013 | Utal ........................ F17C 5/007 137/1 |

* cited by examiner

MODULAR COMPRESSED NATURAL GAS SYSTEM FOR USE AT A WELLSITE

RELATED APPLICATIONS

This application claims priority to and the benefit of co-pending U.S. patent application Ser. No. 13/573,699, filed Oct. 3, 2012, the full disclosure of which is hereby incorporated by reference herein for all purposes.

BACKGROUND

1. Field of Invention

The present disclosure relates in general to a system and method for compressing gas. More specifically, the present disclosure relates to a modular system that is transportable to a location where gas is accessible from a source, and that compresses gas from the source.

2. Description of Prior Art

Traditionally, internal combustion engines have been fueled by one or more distillates of fuel oil, such as gasoline or diesel. Gasoline or diesel is at atmospheric pressure during filling. Recently a growing number of vehicles have been manufactured, or converted, so their engines operate on natural gas instead of the longer chain hydrocarbons. The availability, low cost, and lower emissions of combusting natural gas over fuel oil distillates have garnered interest in continuing to increase the number of natural gas powered vehicles. Typically, natural gas fills a vehicle at a pressure exceeding 3000 pounds per square inch, which greatly exceeds the atmospheric pressure conditions of traditional fuels. The high filling pressure of natural gas requires compressing the natural gas prior to dispensing it to the vehicle. Thus while there are incentives to power vehicles with natural gas, obstacles exist in its delivery.

SUMMARY OF THE INVENTION

Disclosed herein are methods and systems for supplying combustible gas to consumers at wellsites. In one example method a modular compressor is provided at a location adjacent a field gas pipeline and proximate a wellsite, gas is stored from the field gas pipeline in a transport vessel and compressed within by the modular compressor. The transport vessel with the compressed gas is moved to the wellsite. The method further includes dispensing the compressed gas in the transport vessel at the wellsite. In this example, the wellsite is a first wellsite and the location is proximate additional wellsites, the method further includes dispensing the compressed gas in the transport vessel at a one of the additional wellsites. The step of providing the modular compressor involves providing a standardized shipping container, disposing a compressor package in the container to define the modular compressor, and transporting the modular compressor to the remote location. Further in this example, the compressor package is made up of a compressor, a compressor driver, piping, and valves in the piping that are strategically oriented and located in the shipping container, so that locations of maintenance of the compressor, driver, piping, and valves are accessible through selectively opened access elements in sidewalls of the container. The pressure in the field gas pipeline can range from around 900 psig to around 1200 psig. The shipping container can be an International Standards Organization (ISO) shipping container. The step of compressing gas in the transport vessel with the modular compressor can begin at about the time pressure in the transport vessel is about the same as pressure in the field gas pipeline. In one example, compressing gas in the transport vessel with the modular compressor includes flowing field gas from the field gas pipeline to the modular compressor, compressing the field gas with the modular compressor to form compressed gas, and directing the compressed gas to the transport vessel, that in turn compresses gas in the transport vessel.

An alternate method of supplying combustible gas includes providing a modular compressor, where the modular compressor is made up of a compressor package in a standardized shipping container. The method further includes directing gas from a field gas pipeline in a transport vessel, compressing gas in the transport vessel with the modular compressor at a location adjacent the field gas pipeline and proximate a wellsite, and moving the transport vessel to the wellsite. The transport vessel can be mounted on a vehicle. In an alternate embodiment, the wellsite is a first wellsite, and the method further includes transporting the compressed gas in the transport vessel to a second wellsite that is proximate the first wellsite. Further, the compressed gas can be dispensed to a compressed gas user at the second wellsite. The pressure at a discharge of the modular compressor can be at about 4000 psig.

An example system for providing combustible gas contains a modular compressor having a compressor package in a standardized shipping container and that is disposed adjacent a field gas pipeline. The system further includes a flow line that selectively flows field gas from the field gas pipeline to the modular compressor and that selectively flows the field gas to a transport vessel and a discharge line having an end connected to a discharge of the modular compressor and to the transport vessel, so that when compressed field gas is discharged from the discharge of the modular compressor into the discharge line, the compressed field gas flows into and compresses field gas in the transport vessel. Valves can be included in the flow line and the discharge line, and further optionally included is a controller for selectively opening and closing the valves in the flow line and the discharge line. The transport vessel can be on a vehicle, so that the compressed field gas in the transport vessel is transportable to users of the compressed field gas that are located at a wellsite proximate the modular compressor.

BRIEF DESCRIPTION OF DRAWINGS

Some of the features and benefits of the present invention having been stated, others will become apparent as the description proceeds when taken in conjunction with the accompanying drawings, in which.

Figure 1:
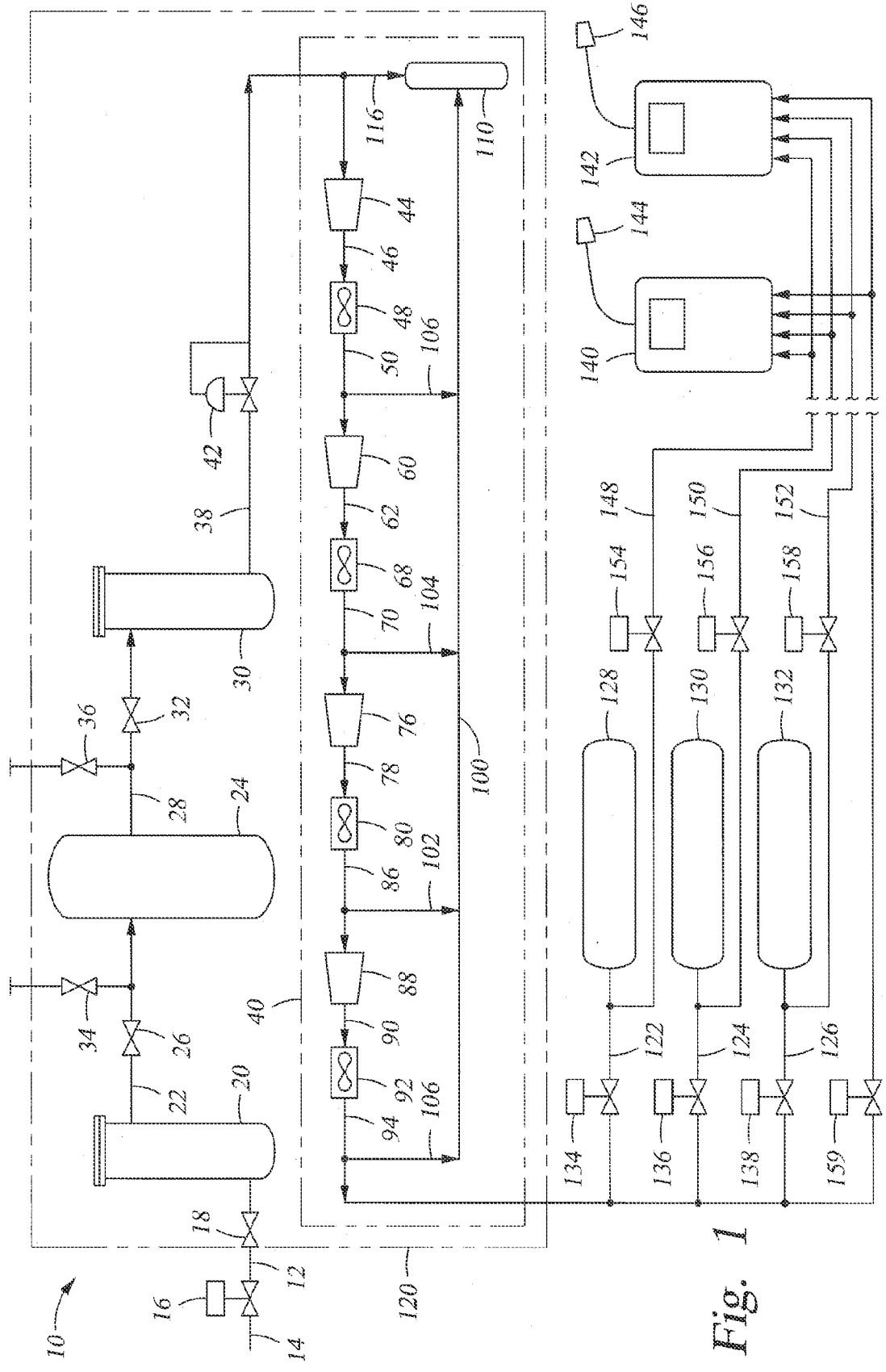
FIG. 1 is a schematic example of a compressed natural gas system disposed in a container in accordance with the present disclosure.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term about includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 is a schematic illustration of a compressed gas (CG) system 10 shown having an inlet line 12 for delivering gas to the CG system 10. The inlet line 12 attaches to a supply line 14; which in an example is in communication with a utility distribution system that distributes natural gas to residential and commercial customers of natural gas, and operates at example pressures of from about 0.5 psig to about 200 psig. Alternatively, the supply line 14 can be in communication with a transmission line and having example operating pressures of from about 200 psig to about 1500 psig. Example gases include hydrocarbons that are a gas at standard temperature and pressure, such as but not limited to methane, ethane, propane, butane, and mixtures thereof. In an example, the hydrocarbons can be saturated or unsaturated, and the gas can include trace amounts of non-hydrocarbons, such as nitrogen, hydrogen, oxygen, sulfur. A shut-off valve 16, which may optionally be automated or manual, is shown at the connection between the inlet line 12 and supply line 14 for selectively blocking communication between the inlet line 12 and supply line 14. Optionally, an additional valve 18 may be provided in the inlet line 12 downstream of valve 16. Inlet line 12 terminates at a filter 20, which may be used for removing particles and other non-desirable matter from within a stream of gas flowing within the inlet line 12. Filter 20 connects via line 22 to a dryer 24, which may include a desiccant for removing moisture from the gas stream. Optionally, dryer 24 can be empty and provide an open space to operate as a knockout drum thereby removing moisture by gravity separation. Valve 26 is disposed in line 22 for selectively blocking flow between filter 20 and dryer 24. An outlet line 28 connects dryer 24 to a second filter 30 for additional filtering downstream of the dryer 24. Valve 32 is shown in line 28 and selectively blocks communication between dryer 24 and filter 30. Optional regeneration lines 34, 36 are shown connecting respectively to line 22 and line 28 between the dryer 24 and valves 26, 32. Desiccant in the dryer 24 can be regenerated by closing valves 26, 32 to isolate dryer 24, opening valves in regeneration lines 34, 36, and circulating a hot and/or dry gas through regeneration lines 34, 36 and dryer 24. Line 38 connects to filter 30 on one end and to a compressor package 40 on another for transmitting gas from the filter 30 to be compressed within the compressor package 40. A pressure control valve 42 is shown in line 38 for controlling the flow of gas within line 38.

The example compressor package 40 of FIG. 1 is shown having a first stage compressor 44 wherein in an example, the compressor 44 is a reciprocating compressor. Line 46 connects an outlet of the first stage compressor 44 with a first interstage cooler 48. In the example of FIG. 1, first interstage cooler 48 is air cooled, but other cooling mediums may be employed. An outlet line 50 from the first interstage cooler 48 connects to an inlet of a second stage compressor 60. In the second stage compression section of the compressor package 40 of FIG. 1, the exit or discharge of the second state compressor 60 connects to line 62 that has an opposite end connecting to a second interstage cooler 68. A discharge of the second interstage cooler 68 attaches to line 70 that in turn connects to an inlet of a third stage compressor 76. Line 78 has an end connecting to a discharge of third stage compressor 76 and an opposite end connecting to an inlet of a third interstage cooler 80. Line 82 shown connecting to an exit of the third interstage cooler 80 and an inlet of a fourth stage compressor 88. An exit of the fourth stage compressor 88 connects to line 90, which is shown having an opposite end connecting to an inlet of fourth interstage cooler 92. Line 94 connects an exit of the fourth interstage cooler 92 and provides a transmission line for discharging compressed gas from the compressor package 40. Thus, in one example, the compressor package 40 receives gas at about the pressure in the supply line 14 and compresses the gas to pressures in excess of about 3000 psig, and alternatively to pressures in excess of about 3600 psig. Optionally, the discharge pressure end line 94 can be in excess of about 4000 psig, and alternatively to pressures in excess of about 4700 psig. Compressors for use with the method and system described herein are not limited to four stage compressors; alternative embodiments exist wherein the gas is compressed with a compressor having, one stage, two stages, three stages, five stages, or more than five stages.

Further illustrated in FIG. 1, are blowdown lines 100, 102, 104, 106 that connect respectively to lines 50, 70, 82, 94 and terminate in blowdown header 108. Blowdown header 108 connects to blowdown drum. Thus, in situations where operation of the compressor package 40 is terminated, either planned or not, compressed gas within the various stages of the compressor package 40 can be directed to the blowdown drum 110, where upon restart of a compressor package 40, gas in the blowdown drum 110 can flow through line 116 and return to line 38 as shown and to an inlet of the compressor package 40.

Still referring to FIG. 1, the filters 20, 30, dryer 24, and compressor package 40 are schematically illustrated as being within container 120, wherein valve 18 is disposed just inside of container 120. As will be described in more detail below, example containers may include those manufactured to an international standards organization (ISO) and more specifically to ISO standard 6346. An advantage of a standardized container housing the CG system 10 is that after the CG system 10 is installed in the container 120, the container 120 and its contents are readily transported as a single modular unit. This is because most shippers of freight use vehicles (e.g. trains, tractor trailer rigs, cargo ships) equipped to receive and stow a standardized shipping container. Moreover, attachment points provided on a readily available ISO container enable them to be safely secured in or on a shipping vehicle.

The CG system 10 of FIG. 1 further includes lines 122, 124, 126 that branch from a portion of the line 94 downstream of the compressor package 40. Lines 122, 124, 126 respectively connect to an inlet of storage tanks 128, 130, 132. Although three storage tanks 128, 130, 132 are illustrated, embodiments exist of the CG system 10 disclosed herein having zero, one, two, four, and more than four storage tanks. Schematically shown in FIG. 1, the storage tanks 128, 130, 132 are substantially elongate and cylindrical members that in one example are arranged in parallel and mounted on a upper surface of container 120. In an alternative, the tanks 128, 130, 132 can be provided on side or lower surfaces of the container 120, or separate from the container 120, such as at grade. Valves 134, 136, 138 are respectively provided in lines 122, 124, 126 and are for selectively regulating flow to tanks 128, 130, 132.

Gas compressed in CG system 10 can be accessible to end users of the compressed gas via dispensers 140, 142. Nozzles 144, 146 on dispensers 140, 142 provide a flow path for gas compressed in the CG system 10 to a vehicle (not shown) or other storage vessel for compressed gas purchased by a consumer. Thus, dispensers 140, 142 may be equipped with card readers or other payment methods so that a consumer may purchase an amount of compressed gas at the dispensers 140, 142. Although two dispensers 140, 142 are shown, the CN system 10 can have one, three, or more than three dispensers. Lines 94, 148, 150, 152 provide example flow paths between the CG system 10 and dispensers 140, 142. In the example of FIG. 1, lines 148, 150, 152 have an inlet end connected to lines 122, 124, 126 and downstream of valves 134, 136, 138. Valves 154, 156, 158 are provided respectively in lines 148, 150, 152; selective opening and closing of valves 154, 156, 158 in combination with selective opening and closing of valves 134, 136, 138, 159 selectively deliver compressed gas to storage tanks 128, 130, 132 or directly to dispensers 140, 142. Optionally, gas stored within tanks 128, 130, 132 can be selectively delivered through one of lines 148, 150, 152 by the closing of valves 154, 156, 158. In one example, compressed gas can flow directly from the compressor package 40 through line 94 to the dispensers 140, 142. In this example, valve 159 in line 94 is open to allow flow through line 94.

Figure 2:
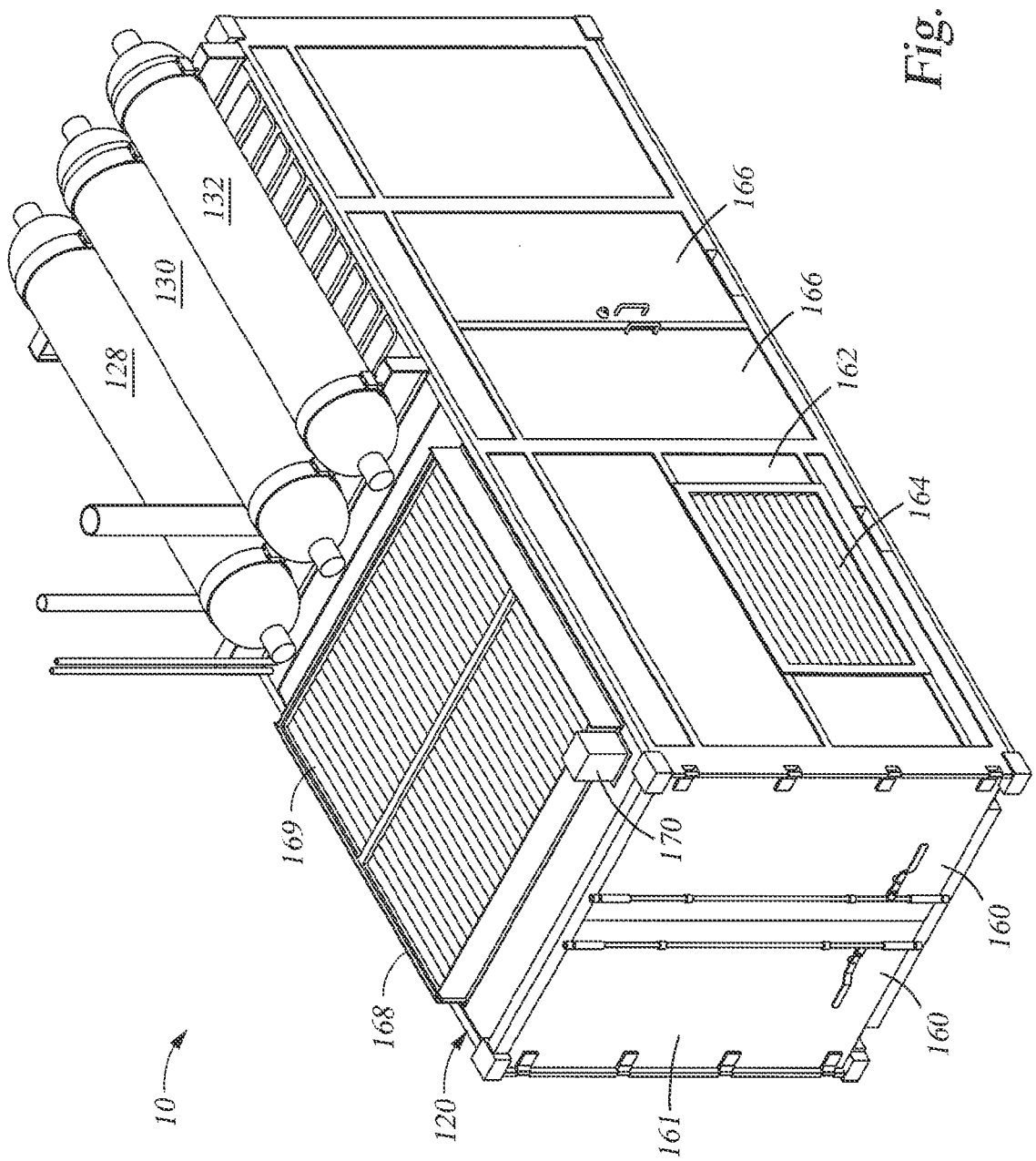
FIG. 2 is a perspective view of a front end of the container of FIG. 1 in accordance with the present disclosure.

Referring now to FIG. 2, shown in a perspective view is an example embodiment of the CG system 10 housed in container 120. In the example of FIG. 2, the container 120 is an ISO shipping container and having hinged doors 160 on a forward end 161 of the container 120. The doors 160 have vertical locking rods for securing the doors 160 closed. Horizontally oriented structure members are further illustrated at spaced apart vertical locations on the doors 160. Hinges on the opposite lateral ends of the doors 160 mount the doors to lateral sides of the container 120, the hinged attachments allow outward opening of the doors 160 and maximize access to within the container 120 from the forward end 161. An opening is shown formed on a lower panel of a right lateral side 162 of the container 120. A vent 164 is mounted in the opening, and may be retained therein by fasteners (not shown) that are readily removed thereby allowing quick and repeated access to within the container 120 via the opening. Lateral doors 166 are shown provided onto the right lateral side 162 having hinges on opposing lateral sides and handles for opening of the doors 166. In an example, a standard ISO shipping container was modified by adding the opening for the vent 164 and the lateral doors 166.

Further shown in the example of FIG. 2 is a louvered vent 168 provided on an upper surface of the container 120. The louvered vent 168 mounts in a rectangularly shaped frame that is generally coplanar with the upper surface of the container 120. However, the louvered vent 168 can be on any surface of the container 120, including the side and lower surfaces. A series of elongate louvers 169 within the frame extend along a line generally parallel with the lateral side of the container 120. However, the louvers 169 may be oriented in other directions. The louvers 169 are mechanically coupled with actuator 170 shown set in a housing adjacent the frame of the louvered vent 168. As will be described in more detail below, energizing the actuator 170 allows the louvers 169 to rotate about an axis that extends along their elongate length. Thus, communication between an inside and outside of the container 120 may selectively take place by operation of the actuator 170. An advantage of a closable louvered vent 168 is the prevention of precipitation, debris, and other materials from entering into the container 120 that may harm or otherwise limit the life of the CG system 10 retained therein. Optionally, the louvers 169 can be cycled to prevent ice or snow buildup on the louvered vent 168. In another alternative, the louvers 169 can be closed to retain thermal energy within the housing 120 so that the machinery and other components in the CG system 10 can be maintained within a designated ambient operational environment. In another alternative, a motor (not shown) for driving fan 180 (FIG. 5) can have a varying output speed, such as by implementing a variable speed controller, to regulate temperature inside the container 120.

Still referring to FIG. 2, tanks 128, 130, 132 are shown mounted on elongate supports that extend between lateral sides of the container 120 on the upper surface of the container 120. Semicircular recesses are formed in the supports that provide a seat for the tanks 128, 130, 132. Straps are fastened to the support and extend over the upper surface of the tanks 128, 130, 132 for securing the tanks 128, 130, 132 to the supports and to the container 120. Also on the upper surface of the container 120 are annular risers extending upward for venting gas relieved from the CG system 10 as needed.

Figure 3:
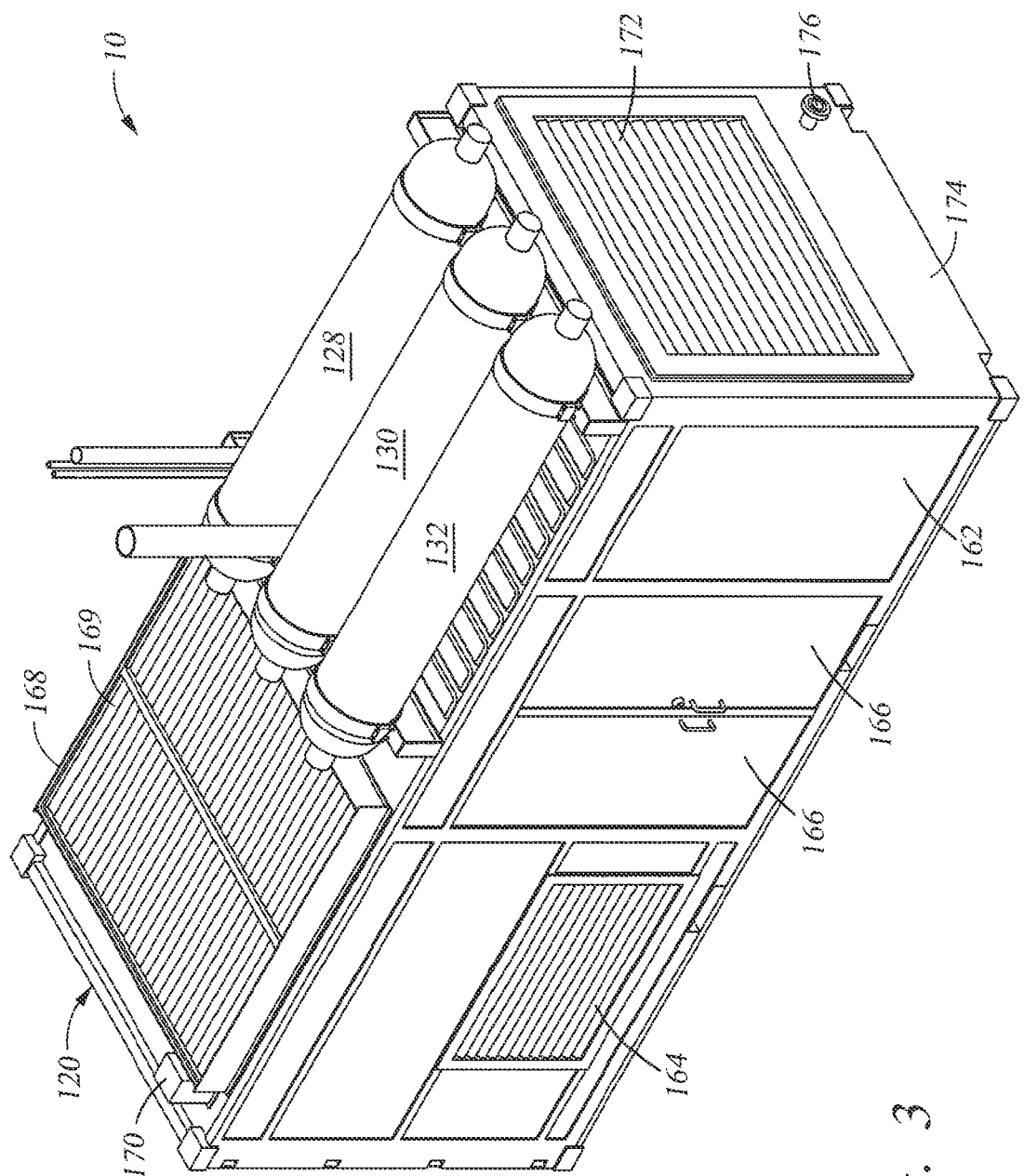
FIG. 3 is a perspective view of a rearward end of the container of FIG. 1 in accordance with the present disclosure.

Referring to FIG. 3, illustrated is a perspective view of the CG system 10 and container 120, with a vent 172 releasably mounted in an opening formed in a rearward end 174 of the container 120. Similar to vent 164, vent 172 can be mounted with fasteners that allow for easy removal of vent 172 for access to components of the CG system 10 within container 120. Also set on the rearward end 174 of container 120 is a flanged fitting 176 mounted on end of inlet line 12 (FIG. 1) for connecting to valve 16 (FIG. 1) and supply line 14 (FIG. 1). Accordingly, in one example, the CG system 10 is installed within container 120 at an installation facility, and transported to a location proximate a supply line, and a tie-in can be made between the supply line and CG system 10 via flanged fitting 176.

Figure 4:
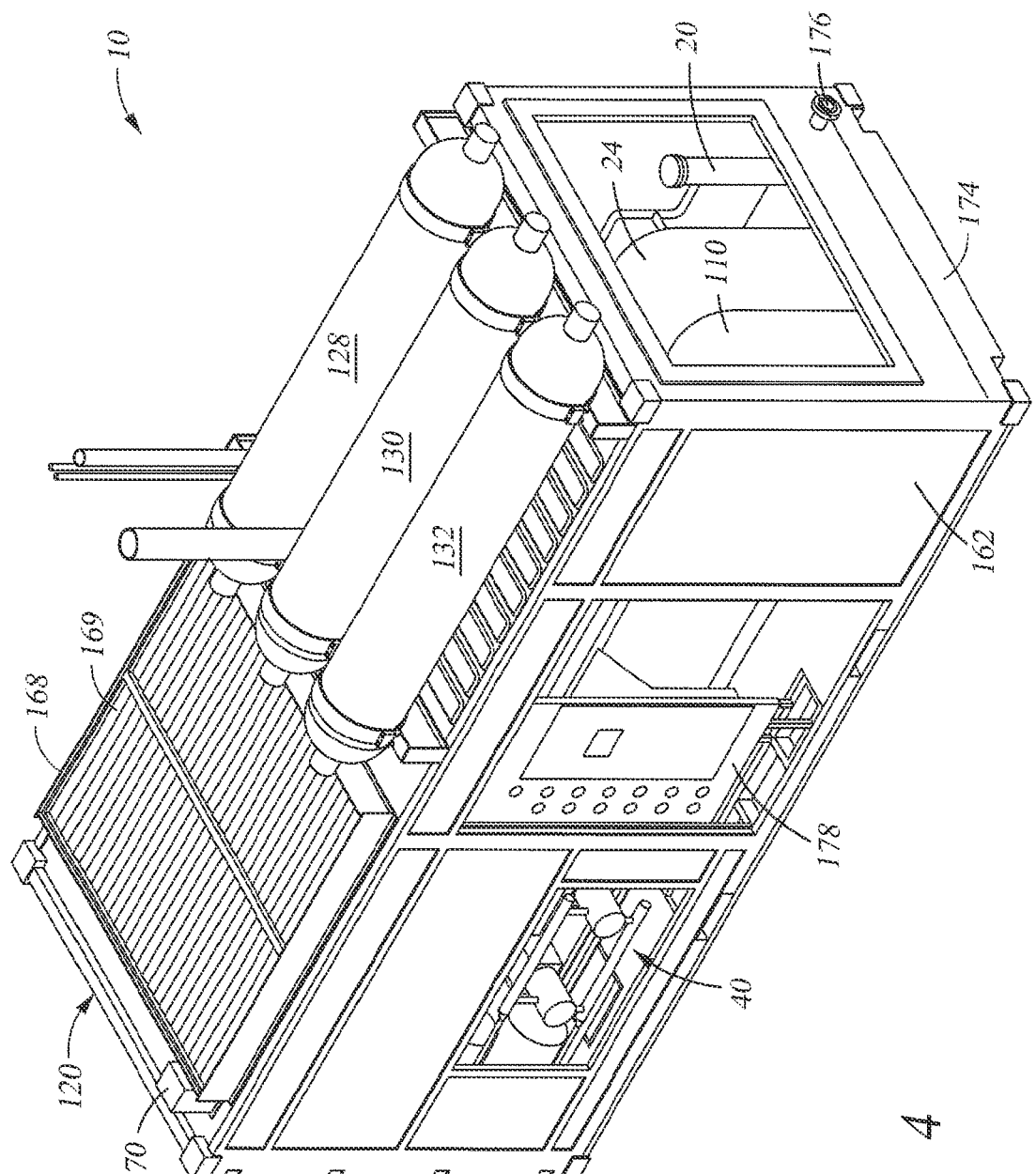
FIG. 4 is a perspective view of a rearward end of the container of FIG. 1 having elements removed from the container in accordance with the present disclosure.

FIG. 4 illustrates a side perspective view of the CG system 10 within container 120, wherein vent 174 (FIG. 3), lateral doors 166 (FIG. 2), and vent 164 (FIG. 2) have been removed. As noted above, the vents 172, 164 may be easily removed thereby providing access to components of the CG system 10 that may need maintenance. As can be seen in the example of FIG. 4, readily accessible from the outside of the container 120 are the filter 20, dryer 24 and blowdown drum 110. Also shown are portions of the compressor package 40 that are readily accessible via opening in which vent 164 (FIG. 2) may be set. Further illustrated in FIG. 4 is a control panel 178 mounted in the container 120 and set back inward from the opening where the lateral doors 166 (FIG. 3) are installed. As will be discussed in more detail below, control panel 178 can provide an interface for manual operation of the CG system 10 and can also include gages for pressure and temperature of the gas within the CG system 10.

Figure 5:
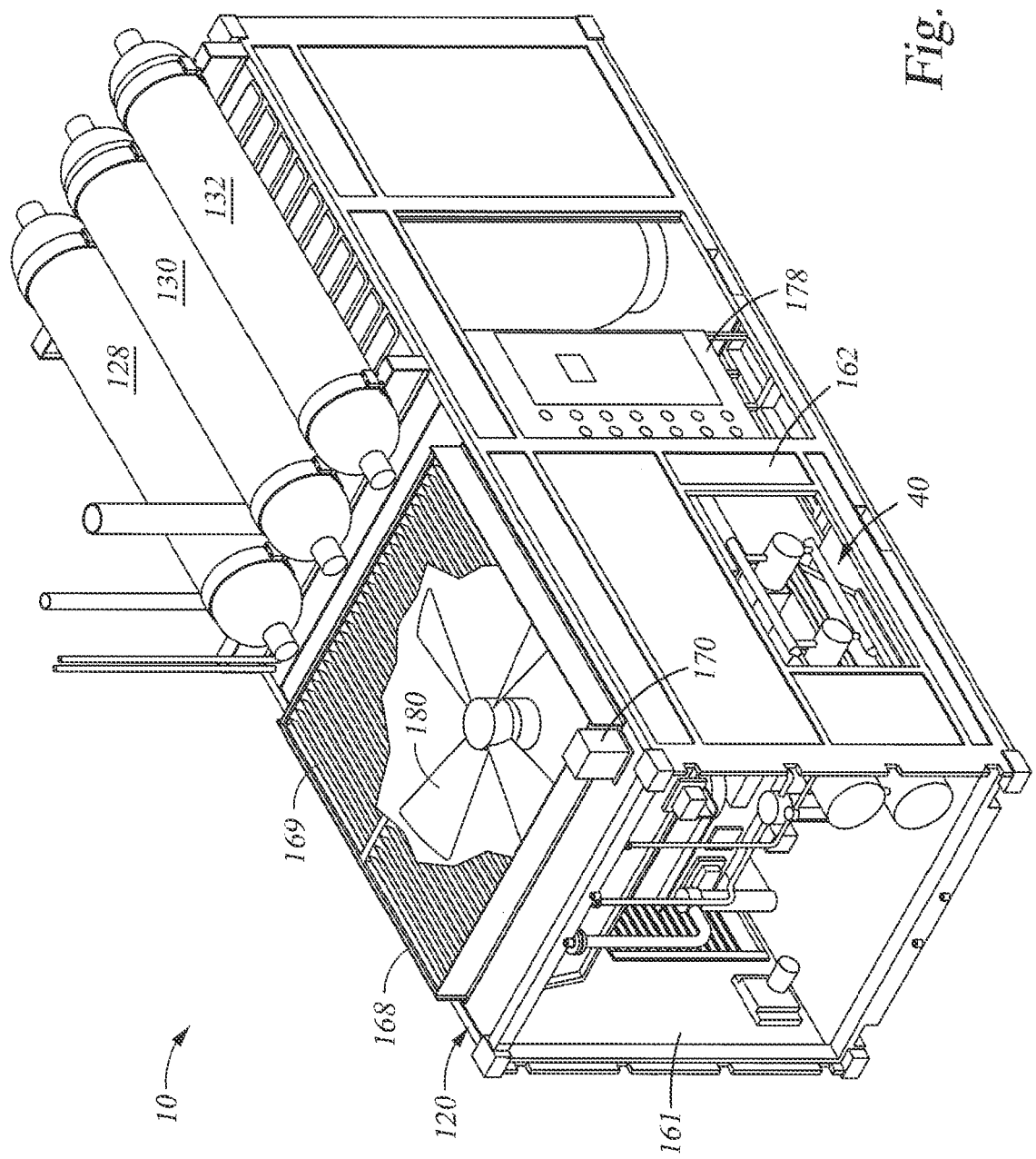
FIG. 5 is a perspective view of a front end of the container of FIG. 1 having elements removed from the container and a louvered vent in an open position and in accordance with the present disclosure.

FIG. 5 is a side perspective view showing doors 160 (FIG. 2) removed from the forward end 161 of the container 120. In one example, openings are provided at strategic locations on the sidewalls of container 120 in which readily replaceable and removable vents are disposed so that access to all maintainable items within the CG system 10 is available and without removing any components of the CG system 10. Additionally illustrated in FIG. 5 is that the actuator 170 has been energized to rotate louvers 169 so that communication between the outside and inside of the container 120 is available through the louvered vent 168. To facilitate air flow through the container 120, an optional fan 180 is shown set in the container 120 and beneath the louvered vent 168. Selective closing of the louvered vent 168 by operation of the actuator 170 and louvers 169 limits an inflow of debris, precipitation, or other such substances, through the louvered vent 168 that may land on the fan and/or other working components of the CG system 10. Reducing the introduction of foreign material inside of the container 120 optimizes performance of the CG system 10 and prolongs its life.

Figure 6:
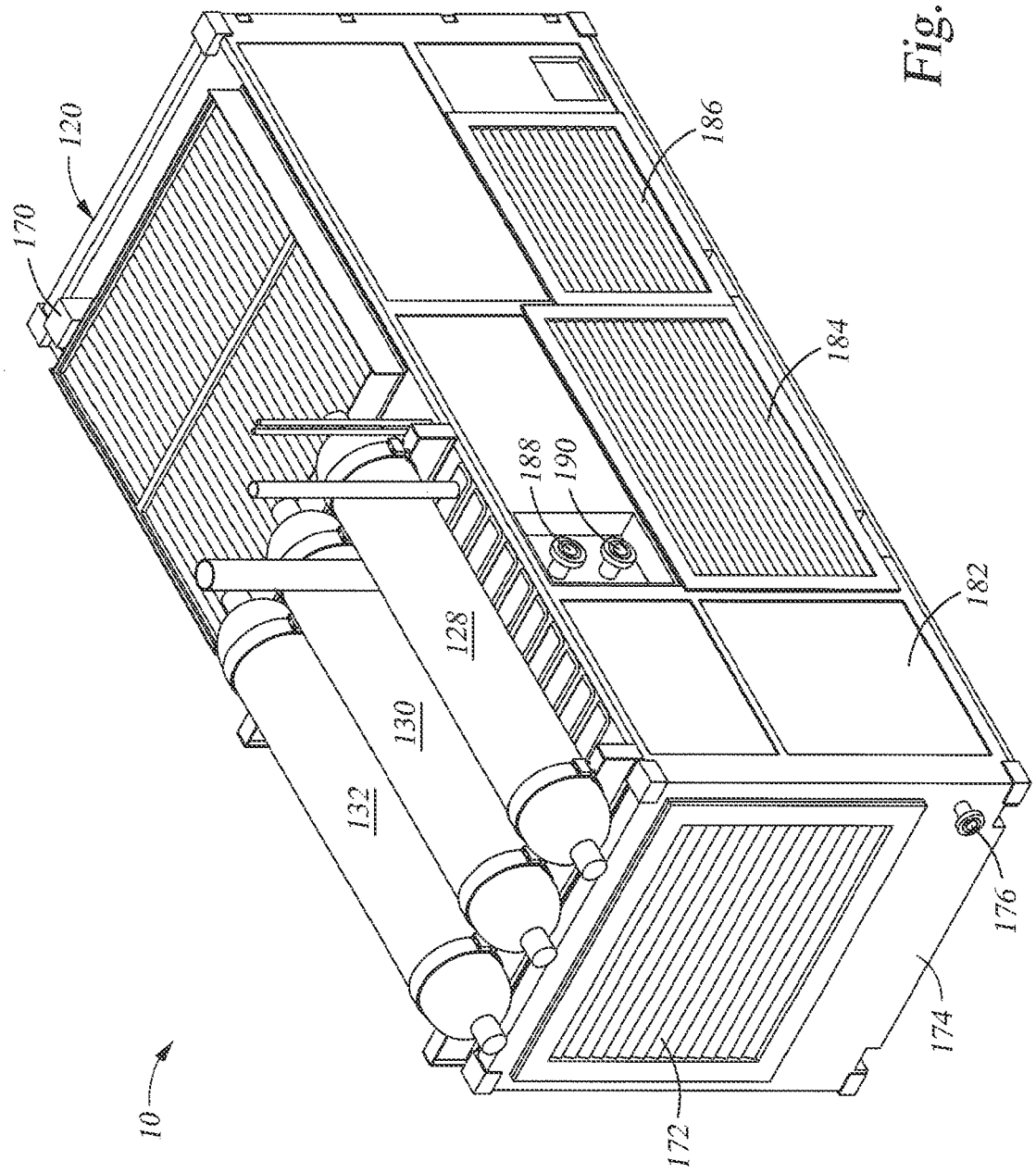
FIG. 6 is a perspective view of a rearward end of the container of FIG. 1 in accordance with the present disclosure.

FIG. 6 illustrates a perspective view of the CG system 10 within container 120 and illustrates a left lateral side 182 and rearward end 174 of container 120. In this example, illustrated are vents 184, 186 set within openings provided on the left lateral side 182. Also on the left lateral side 182 of this example are flanged fittings 188, 190 that connect to regeneration lines 34, 36 for selective regeneration of the dryer 24. Thus, another additional advantage of the selective placement of flanged fittings is the ability to regenerate the dryer 24 from outside of the container 120.

Figure 7:
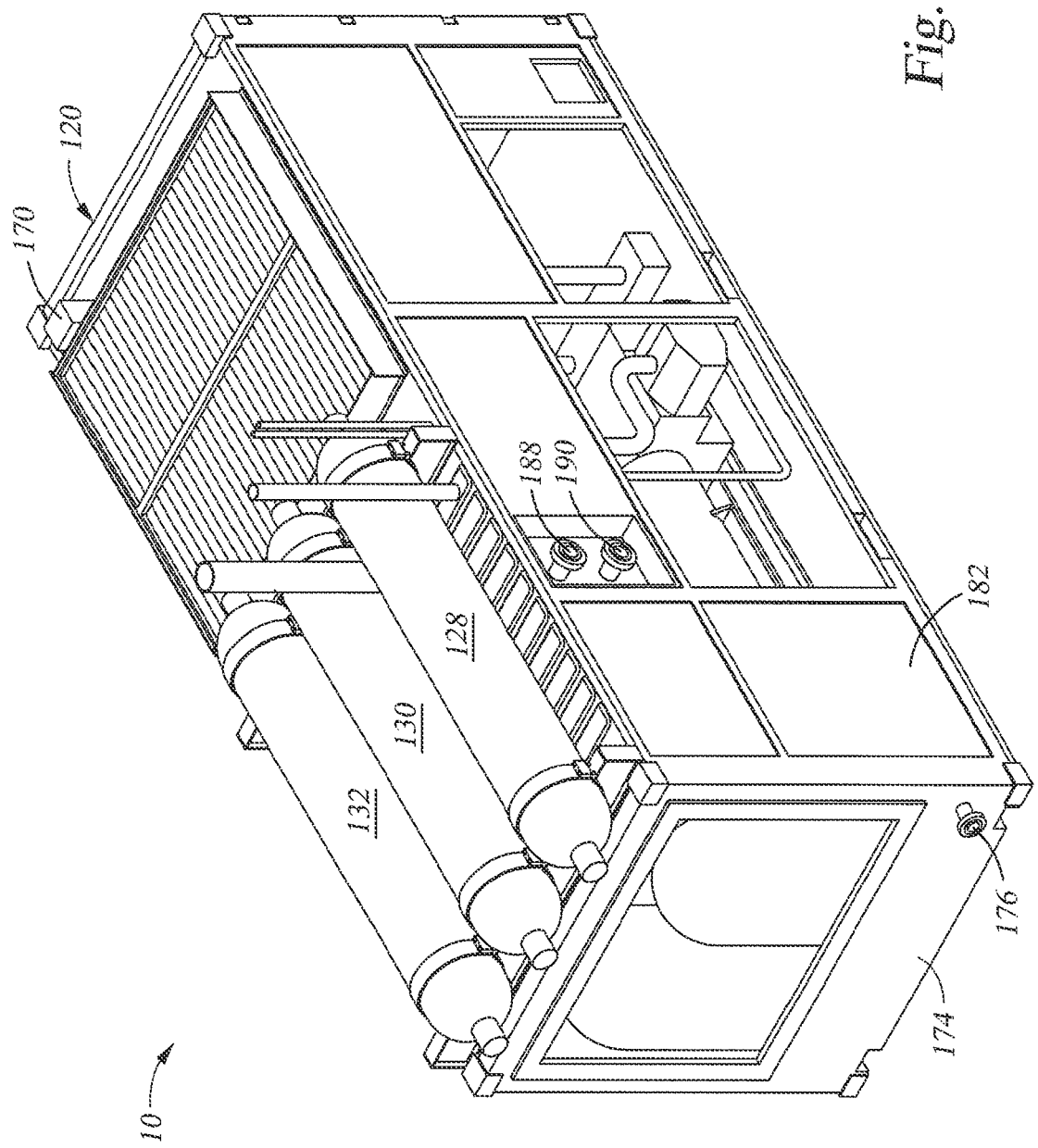
FIG. 7 is a perspective view of a rearward end of the container of FIG. 1 having elements removed from the container in accordance with the present disclosure.

FIG. 7 illustrates a similar view of FIG. 6 of the CG system 10 and container 120 but with vents 184, 186 missing from the openings on the left lateral side 182. Also missing is vent 172 on the rearward end 174 (FIG. 3). Removal of vents 184, 186 further illustrates the advantage of selective placement of openings in the sidewalls of container 120 so that access to components of the CG system 10, such as compressor package 40, is made convenient. However, during expected operation of the CG system 10 the vents will be in place in the openings thereby providing a barrier to trespass and other unwanted intrusions within the container 120.

Figure 8:
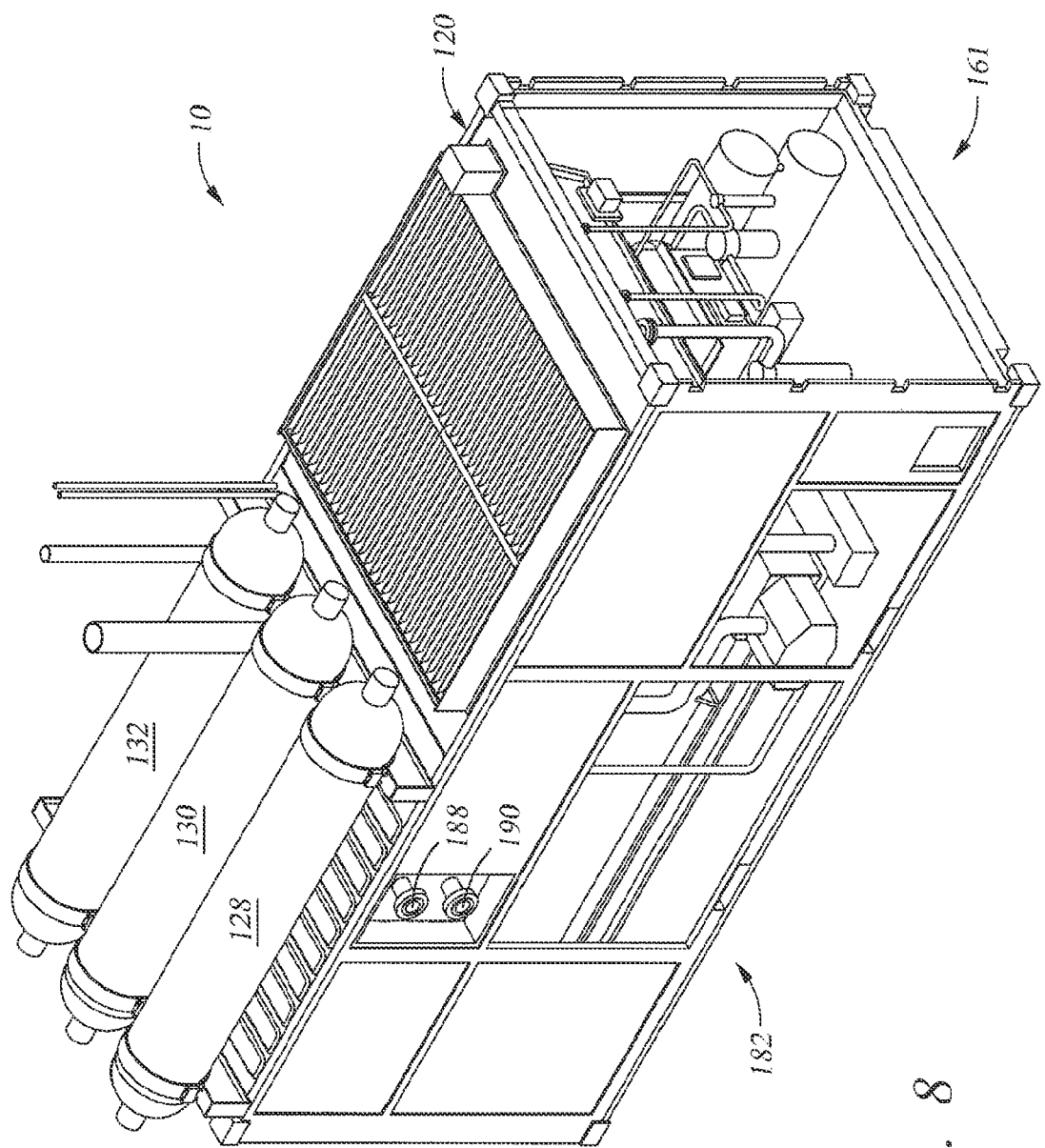
FIG. 8 is a perspective view of a front end of the container of FIG. 1 having elements removed from the container and a louvered vent in an open position and in accordance with the present disclosure.

FIG. 8 shows a perspective view of the CG system 10 within container 120, and illustrates doors 160 removed from the forward end 161 of the container 120. Also removed are vents 184, 186 (FIG. 6) and vent 164 (FIG. 3). FIG. 8 further illustrates the accessibility of components in the CG system 10 by strategically positioning the openings in the sidewall in the container 120. Moreover, strategic orientation of the components within the CG system 10 inside the container 120 contributes to the accessibility features of the CG system 10 described herein. For example, orienting the compressor package 40 so that throws or stages of the compressor package 40 point towards the openings in the right and left lateral sides 162, 182 enable ready access to components having a higher frequency of maintenance and/or repair. As such, the vents, doors, and/or panels described herein can be designated as a service element that can be removed to provide access to the CG system 10.

Figure 9:
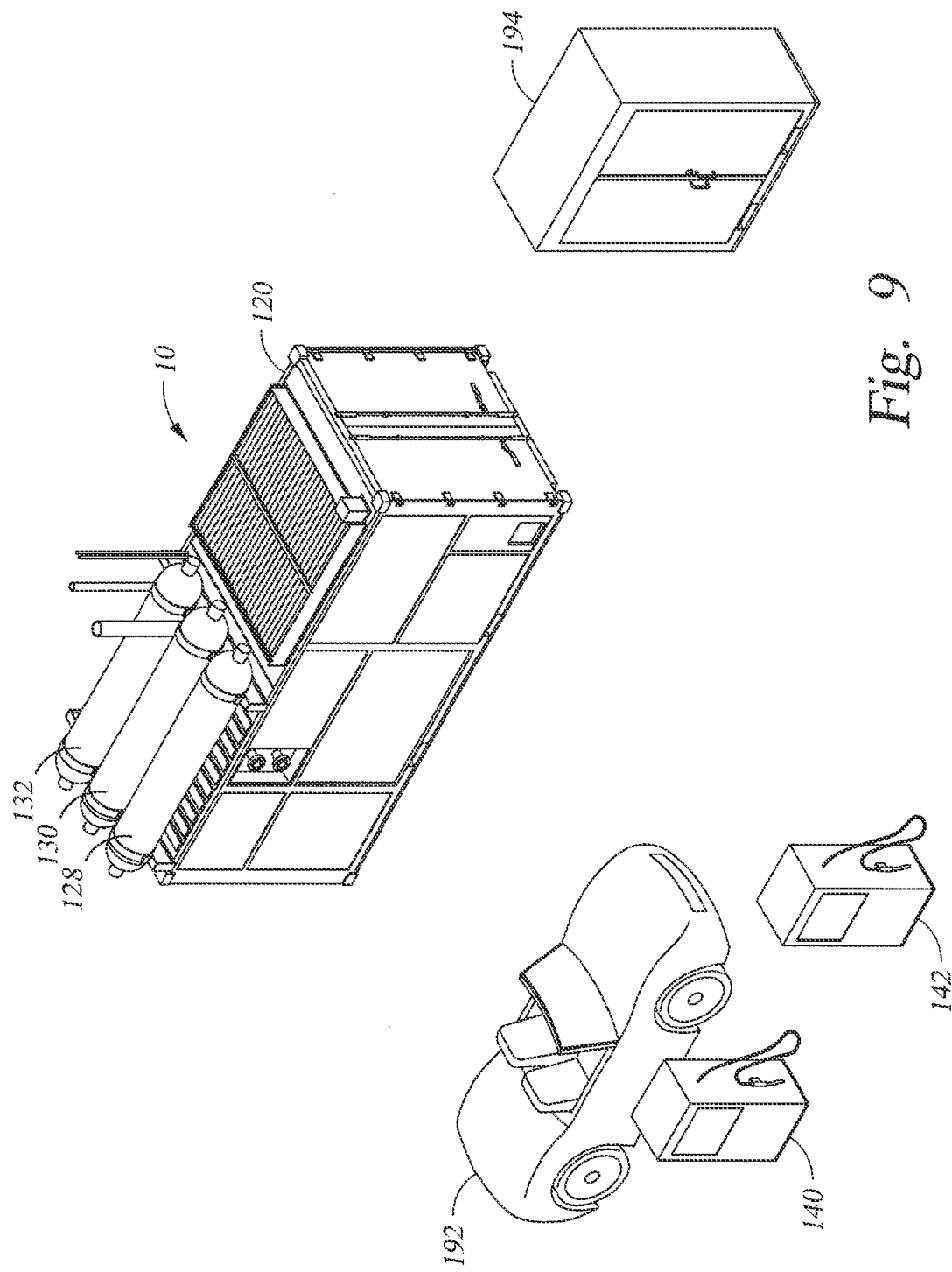
FIG. 9 is a perspective view of an example of the compressed hydrocarbon gas system in a container of FIG. 1 disposed adjacent dispensers and a power supply to form a fueling station in accordance with an embodiment of the present disclosure.

FIG. 9 illustrates an example of a consumer obtaining compressed gas from dispensers 140, 142. In this example, the CG system 10 within container 120 is set at a fueling station wherein a vehicle 192 is positioned for fueling with compressed gas from dispensers 140, 142. In the example, the dispensers 140, 142 are spaced away from container 120, and supply lines from the tanks 128, 130, 132 may be piped underground to the dispensers 140, 142. Alternatively, the dispensers 140, 142 can be integrated in the housing 120, so that the nozzles can mount directly to the housing 120 rather than to the dispensers 140, 142. Further provided in FIG. 9 is an example of a power box 194 that provides a connection point for utility supplied power for powering the CG system 10. In one example, the power box 194 is set a distance from the container 120 for safety reasons. In an embodiment, the power box 194 includes one or more of a transformer for control power, circuit breakers, starters for small motors, an exterior disconnect handle, emergency stop push button, and an uninterrupted power supply. FIG. 9 illustrates an example of the CG system 10 being manufactured in the container 120 at a manufacturing location, and then having been shipped to the fueling station, where a supply line 14 (FIG. 1) is located at or proximate the fueling station. Thus after the CG system 10 in the container 120 is delivered to the fueling station the inlet line 12 (FIG. 1) is connected to the supply line 14.

Figure 10:
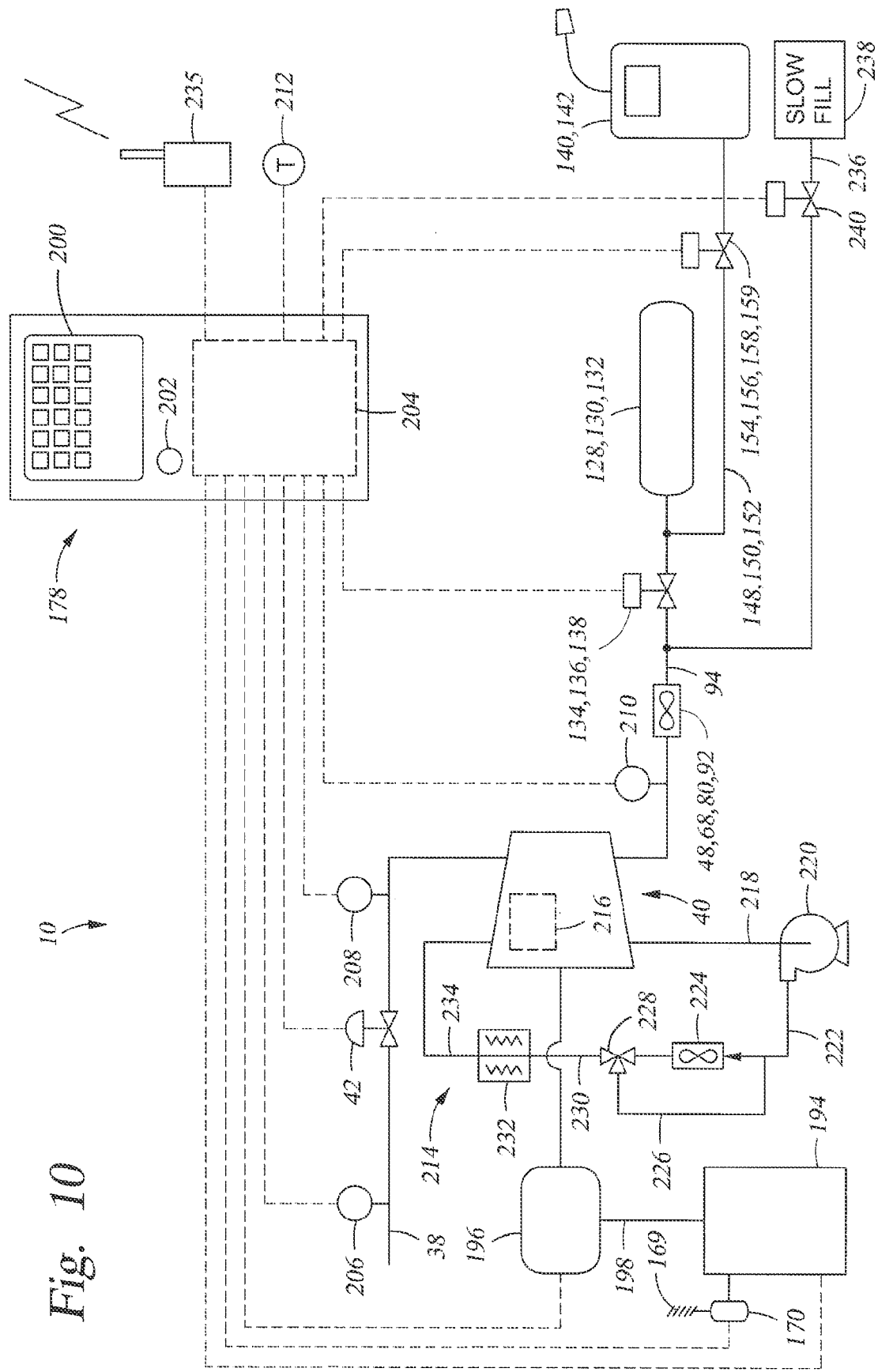
FIG. 10 is a schematic example of a portion of an embodiment of the compressed hydrocarbon gas system of FIG. 1 in communication with a controller in accordance with an embodiment of the present disclosure.

Schematically illustrated in FIG. 10 is a portion of the CG system 10 wherein the compressor package is represented by a single compressor with an inlet connected to line 38 and outlet to line 94. Moreover, valves 134, 136, 138 of FIG. 1 are represented as a single valve in line 94, and lines 148, 150, 152 are represented by a single line connecting line 94 to dispensers 140, 142. Similarly, tanks 128, 130, 132 are represented by a single tank and valves 154, 156, 158 are represented by a single valve. Further illustrated in FIG. 10 is that power box 194 is shown schematically powering a motor 196 via power line 198. In the example of FIG. 10, motor 196 is used for driving the compressor package 40. Additionally, control panel 178 is schematically depicted as including a touch screen 200 having various buttons for controlling operation of the CG system 10 as well as display features for visually monitoring conditions within the CG system 10. An emergency stop button 202 or master switch is included on the example of the control panel 178 of FIG. 10. Also within control panel 178 is a controller 204 that in some examples may include a programmable logic controller (PLC). The controller 204 is shown in communication, either via hardwire, wireless, or software links, with various components within the CG system 10. In one example, a dew point meter 206 is shown mounted on inlet line 38 and upstream of control valve 42. The dew point meter 206 connects with controller 204 wherein controller 204 can display signals from the dew point meter 206 and/or use information from the dew point meter 206 for controlling operation of the CG system 10. Example operational controls may include affecting the speed or shutting down the compressor package 40 as well as regenerating the dryer 24 (FIG. 1). As an alternative to the motor 196, optional drivers for the compressor package 40 include turbines, gas turbines, engines, and any machine that converts energy into useful mechanical motion.

Further illustrated in FIG. 10, control valve 46 also connects to controller 204 wherein signals may be received by the control valve 42 to regulate the amount of flow through line 38. Pressure taps with pressure indicators 208, 210 are shown in line 38 and line 94 respectively upstream and downstream from the compressor package 40. Signals from the pressure indicators 208, 210 may be communicated to controller 204. Additionally, actuator 170 is shown in communication with controller 204 so that selective operation of the actuator 170 may take place via signals from controller 204 for actuation of louvers 169. A temperature sensor 212 is further illustrated in the example of FIG. 10, where the temperature sensor 212 monitors temperature inside the housing 120 (FIG. 1). The temperature sensor 212 is shown in communication with controller 204, and thus in an example signals are transmitted from the temperature sensor 212 to the controller 204 that represent temperature in the housing 120. Optionally, control of the louvers 169 (and thus actuator 170) can depend on a sensed temperature in the housing 120 by the temperature sensor 212, so that when a designated temperature is sensed, the controller 204 can be programmed to command the actuator 170 to either open or close the louvers 169 for decreasing or increasing temperature in the housing 120. In the example of FIG. 10, air cooler downstream of compressor package 40, which represents the first, second, third, and fourth stage intercoolers 48, 68, 80, 92 (FIG. 1) may be positioned adjacent the louvers 169 and wherein fan 180 provides cooling across these interstage coolers 48, 68, 80, 92. Additionally illustrated in FIG. 10 are that valves 134, 136, 138 are in communication with controller 204 as well as valves 154, 156, 158, 159. Thus, flow through lines 94 and/or lines 148, 150, 152 can be controlled via the controller 204 by manipulation of valves 134, 136, 138 and/or 150, 156, 158, 159 so that flow from the compressor package 40 can flow directly to the storage tanks 128, 130, 132 or direct flow to dispensers 140, 142. Control of the motor 196 can also take place from the controller 204 via a signal line connecting to the controller 204. Additional communication is shown between the power box 194 and controller 204. Signal line can provide data within the power box 194 to controller 204 such as usage of electricity and rates of usage and in some conditions may signal a situation, such as detection of a gas leak or a fire, wherein the controller 204 disconnects power from the power box 194 to the CG system 10.

An embodiment of the CN system 10 exists where a pressure sensor (not shown) in one or more of the dispensers 140, 142 senses pressure in the receptacle (not shown) in which the compressed gas is being dispensed. Where the receptacle can be a tank within a vehicle for storing fuel for the vehicle, or a standalone vessel that is transported away from the CN system 10 after receiving compressed gas. In an example, a designated amount of compressed gas is metered into the receptacle from a dispenser 140, 142, and gas flow from the dispenser 140, 142 is suspended while pressure in the receptacle is measured. Based on the measured value of pressure, an amount of gas (mass or volume) can be estimated required to fill the receptacle. In an example embodiment, the controller is programmed to consider the estimated amount of gas required to fill a receptacle at one of the dispensers 140, and provide a greater flow of compressed gas to the receptacle having the smaller capacity. For example, if dispenser 140 is being accessed to fill a receptacle having a large capacity, and dispenser 142 (or an additional dispenser) is being accessed to fill a receptacle of smaller capacity, flow from dispenser 140 can be given priority over dispenser 142. In one example, giving priority to dispensers 140, 142 includes selectively metering flow from the priority dispenser 140, 142. Alternatively, priority can include closing and/or opening automated valves (not shown) in the lead lines to dispensers 140, 142 from lines 148, 150, 152, 94 (FIG. 1), and selectively closing and/or opening valves 134, 136, 138, 154, 156, 158, 159, so that some or all compressed gas in the CN system 10 flows to the dispenser 140, 142 having priority. Examples of a large capacity receptacle include a fuel tank on a bus, long haul tractor trailer rig, or the like, which may require several minutes to fill, Whereas, a smaller capacity receptacle can include a tank in a passenger vehicle or light duty truck. Prioritizing gas flow to a dispenser filling a smaller capacity receptacle maximizes the number of receptacle filled over time. For example, only a few minutes may be needed to dispense compressed gas to a smaller capacity receptacle; meaning the dispenser can quickly be available for use to fill another receptacle. In contrast, if gas flow to the dispenser dispensing to the small capacity receptacle is reduced while another dispenser dispenses to a large capacity receptacle; the total amount of time both dispensers are in use is increased.

Still referring to FIG. 10, a motor oil circuit 214 is shown for regulating temperature of oil in motor 196. Oil in compressor 40 is contained in crankcase 216 shown in dashed outline in compressor 40; which flows from the crankcase 216 into line 218 to a pump 220 for circulating oil through motor oil circuit 214. Pump 220 discharges into line 222 that carries oil to an air cooler 224. Some of the oil in line 222 is selectively diverted to downstream of air cooler 224 through a bypass line 226 that tees from line 222. Line 226 connects to a temperature controlled three way valve 228 shown in line 230, which carries oil exiting air cooler 224. Line 230 connects to a heater 232 on an end opposite where it connects to air cooler 224. Temperature in the circulating oil is maintained by the combination of the air cooler 224, the heater 232, and the three way valve 228 that regulates how much of the oil flowing through the circuit 214 flows through the air cooler 224. Oil exiting the heater 232 flows back to the crankcase 216 via line 234.

Optionally, a router 235, or other communication device, may be included for remote monitoring of the CN system 10. In an example, the router 235, which can be wireless, is in communication with the controller 204 as shown, and delivers signals to a remote monitoring facility (not shown) that represent conditions and/or operational performance of the CN system 10. Exemplary signals can represent temperatures and/or pressures at locations of the CN system 10, such as from temperature sensor 212 and/or pressure taps 208, 210, as well as signals from dew point meter 206 that can represent moisture content. Signals indicative of pressure and temperature can be from any portion of the CN system 10, and is not limited to the locations monitored by temperature sensor 212 and pressure taps 208, 210. Signals may also represent gas flow rates in the CN system 10, amount of compressed gas dispensed to each receptacle, time of dispensing to each receptacle, capacity of each receptacle receiving compressed gas, power usage of components in the CN system 10, e.g. motors 196, 170, and the detection of gas inside of the container 120. Collecting these values can be useful in evaluating operating performance of a particular CN system 10, scheduling maintenance (including regeneration of desiccant), and economic performance. In an example, information monitored, either locally or remotely, can be used to change a maintenance schedule of a component of the CN system 10 if needed, so the maintenance occurs when needed, e.g., not too soon or too late. Also, monitoring can improve maintenance staging by indicating which components of the CN system 10 might need replacement or repair; so that when serviced all required parts and/or tools are on hand. Improving maintenance staging can eliminate time to retrieve a needed part or tool, thereby reducing maintenance downtime. Additionally, data relating to dispensing of compressed gas can be useful for monitoring the economics of a CN system 10 that is selling compressed gas to consumers, and its location. For example, the number of fills (i.e. customers) over a period of time, the time to fill, and amount of gas dispensed per fill and over time, can be used to assess the value of a particular location over another. This economic information can be useful when making a decision to relocate a particular CN system 10 to another location, or install a new CN system 10 proximate an existing CN system 10.

In an alternative, a slow fill line 236 is shown connecting to line 94 and terminating at a slow fill terminal 238, which can be away from the CN system 10. The slow fill terminal 238 can be used for filling fleet vehicles, such as buses, automobiles, vans, police cars, trucks, taxis, and like, and include a header from which each item being filled connects. A slow fill procedure can take place when the items being filled are not normally in use, such as overnight, weekends, and/or holidays. An advantage of filling during non-peak time can be a cost savings due to lower energy costs to operate the CN system 10. A valve 240 is shown in slow fill line 236 and in communication with the controller 204; so that commands from the controller 204 can regulate flow through the slow fill line 236. In an example, the controller 204 could command valve 240 closed once a designated pressure is reached in the slow fill terminal 238.

Figure 11:
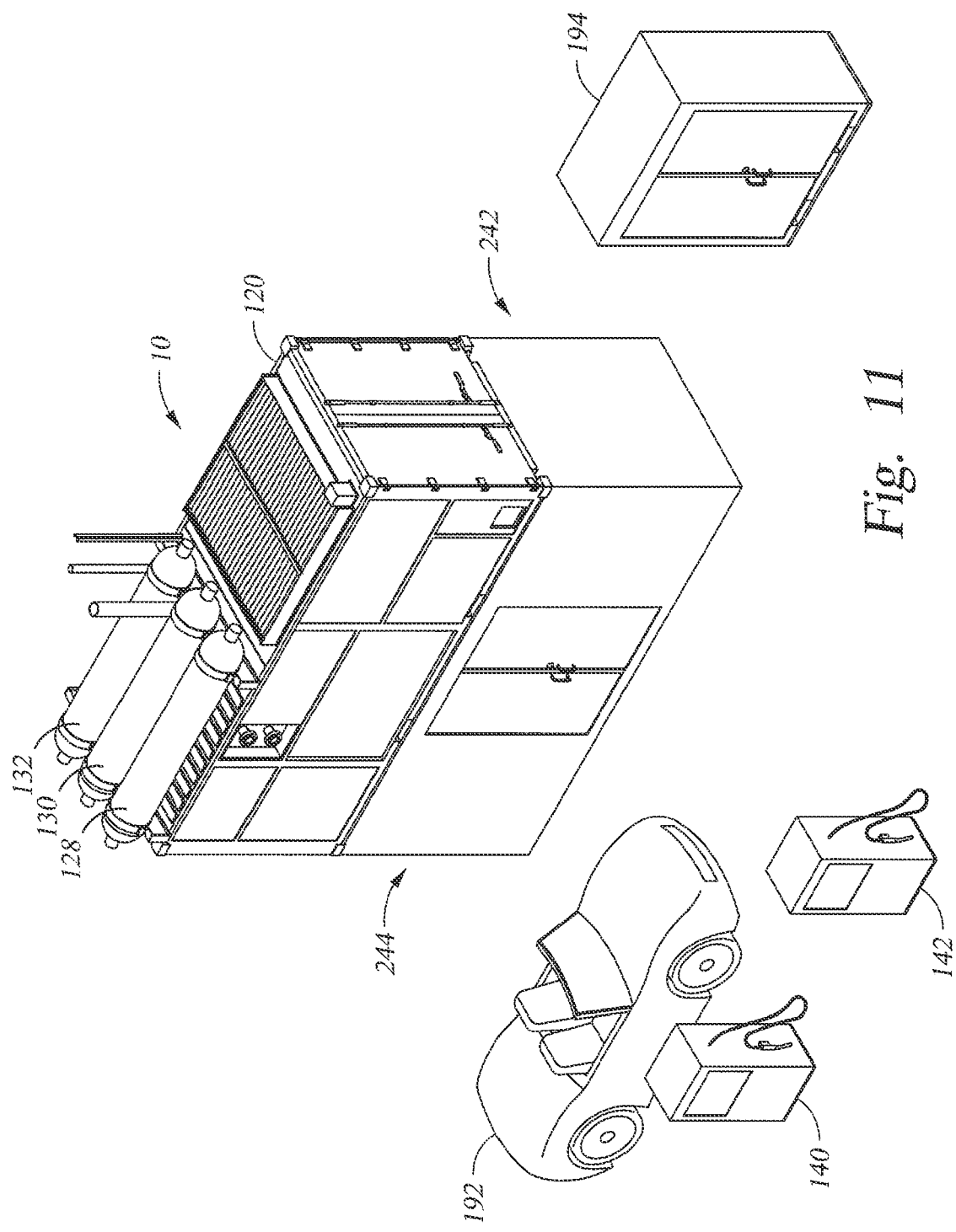
FIG. 11 is a perspective view of an alternate embodiment of the compressed hydrocarbon gas system of FIG. 9 and in accordance with an embodiment of the invention.

FIG. 11 is a perspective example of the embodiment of FIG. 9 wherein the CG system 10 and container 120 are mounted on top of, or supported over, an existing structure 242. In this example, the structure 242 can be a commercial business, such as an existing refueling station where traditional fuels of gasoline and/or diesel are sold on the location having the CG system 10. Optionally, a support frame 244 can be provided for mounting the CG system 10. Thus, in this example, the location of the CG system 10 can provide sales of compressed gas via dispensers 140, 142 and can also provide sales of traditional gasoline and diesel distillate fuels. Another advantage of providing the CG system 10 in container 120 is that an existing fueling station can dispense compressed gas without consuming additional space except for the dispensers. The ability to occupy unused space (i.e. the top of an existing structure) for compressing gas can be essential when a fueling station has restricted space, such as in an urban area. Moreover, disposing the CG system 10, with its storage tanks 128, 130, 132 at elevation increases security of the system 10.

Figure 12:
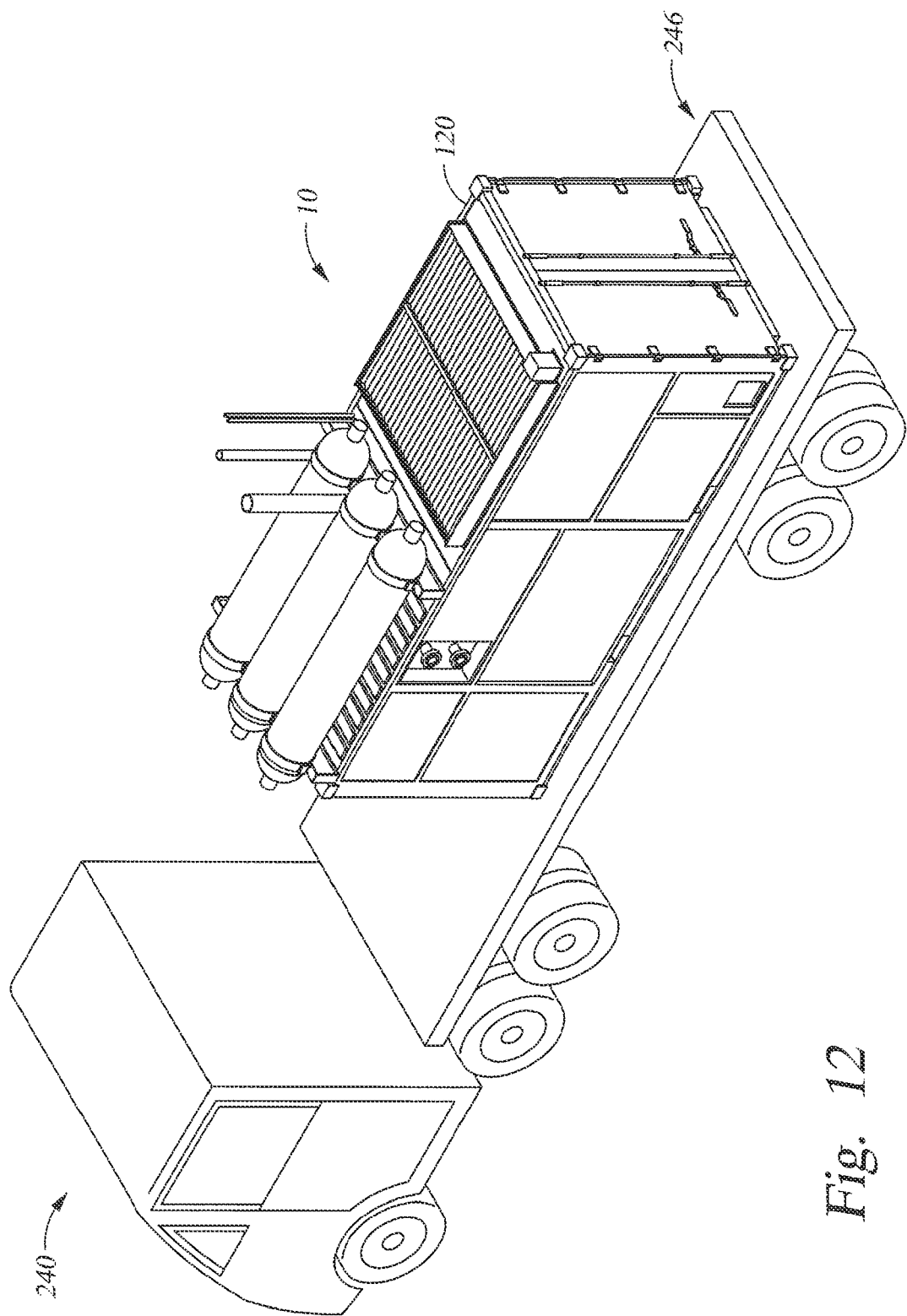
FIG. 12 is a perspective view of an example of the compressed hydrocarbon gas system of FIG. 1 set on a trailer in accordance with an embodiment of the invention.

Referring now to FIG. 12, shown in a perspective view is an example of the CG system 10 in its container 120 set on a wheeled trailer 238. In this embodiment, the CG system 10 can be transported to a location of use, and remain on the trailer 246 while compressing gas and delivering the compressed gas. Further in this example, the dispenser (not shown) can be integral within the housing 120 and the dispenser nozzle mounted on a sidewall of the container 120. Also shown in FIG. 12 is a tractor trailer rig 248 for hauling the trailer 246 and CG system 10. However, examples exist wherein motive powering for moving the CG system 10 is integral with the trailer 246 so a rig 248 would be unnecessary.

Figure 13:
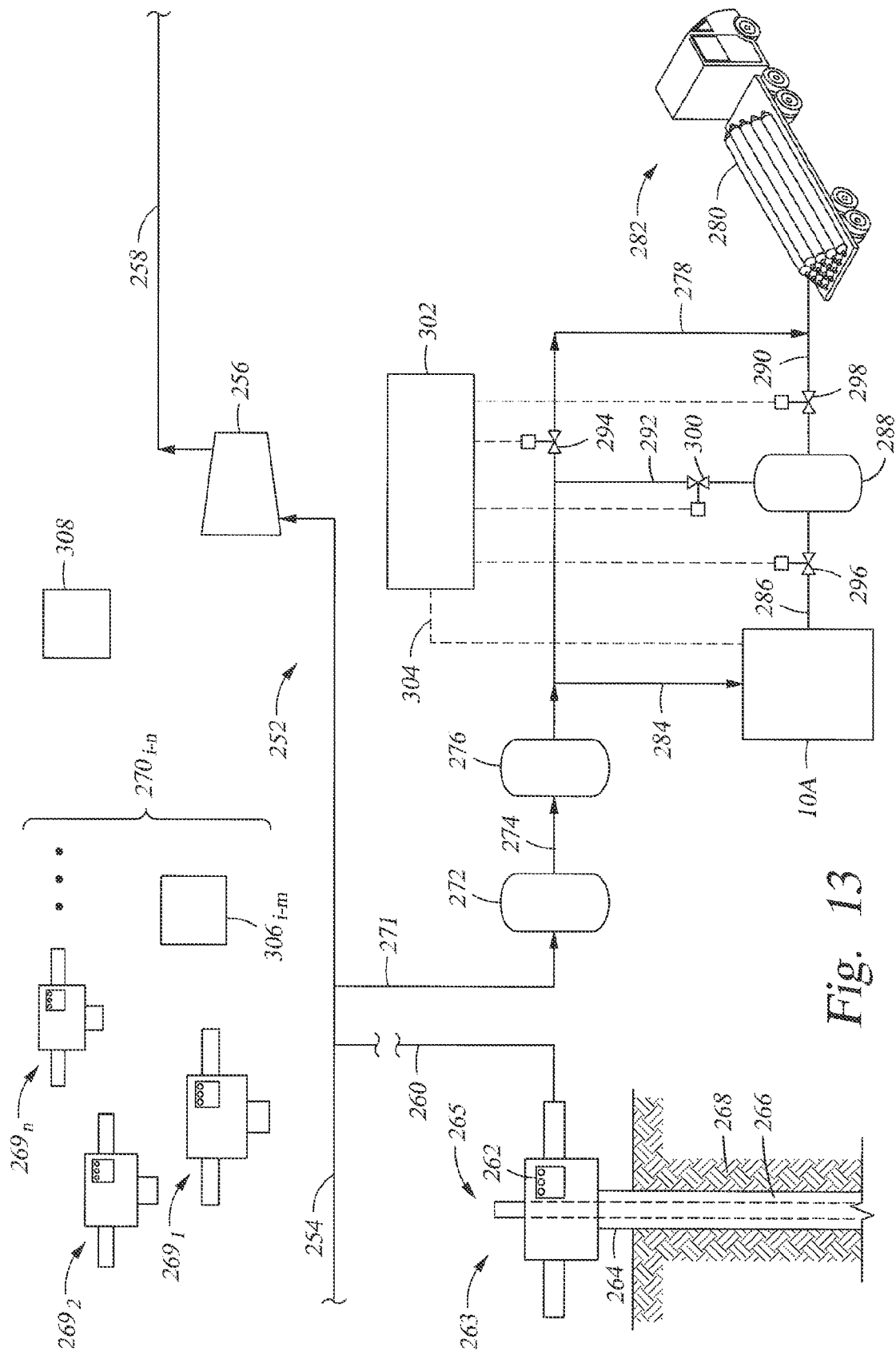
FIG. 13 is a schematic example of a portion of a fuel supply system that employs the compressed hydrocarbon gas system of FIG. 1 and in accordance with an embodiment of the present disclosure.

Schematically illustrated in FIG. 13 is an example of a fuel supply system 252 that draws field gas from a field gas pipeline 254. A compressor 256 compresses field gas flowing in the field gas pipeline 254, and discharges compressed field gas into a discharge pipeline 258 for delivery at a processing and/or refining facility (not shown) distal from compressor 256. A production line 260 is shown connected to field gas pipeline 254 upstream of compressor 256. In the example of FIG. 13, production line 260 connects to a production tree 262 disposed at a wellsite 263. Production tree 262 is coupled on a wellhead housing 264 to define a wellhead assembly 265 that mounts over a wellbore 266. A formation 268 shown below wellsite 263 is intersected by wellbore 266; where in one embodiment at least some of the field gas in field gas pipeline 254 is produced from formation 268. Additional wellhead assemblies $269_{1-n}$ produce field gas that is also routed to field gas pipeline 254 and from wellsites $270_{1-n}$ where the additional wellhead assemblies $269_{1-n}$ are located.

In one example, pressure in the field gas pipeline 254 may be at about 950 psig. Thus, compressors (not shown) may be included between the wellhead assemblies 265, $269_{1-n}$ and field gas pipeline 254 to pressurize gas being directed to field gas pipeline 254. A portion of field gas in the field gas pipeline 254 is drawn off and into feed line 271, which routes the field gas to a fuel conditioner 272. A transfer line 274 connects to a discharge side of fuel conditioner 272 for carrying field gas conditioned within fuel conditioner 272 to a dryer 276 where moisture is removed from within the conditioned field gas. A free fill line 278 is shown connected to a discharge side of dryer 276 and for carrying field gas at a pressure within the field gas pipeline 254 to a transport vessel 280. In the example, the transport vessel 280 is a pressurized container mounted on a vehicle 282. Vehicle 282 in FIG. 13 is illustrated as a tractor trailer, but can be other transportation devices, such as a trailer, van, car, truck, railroad car, or motorized vehicle.

Branching from the free fill line 278 is a lead line 284 for selectively conveying field gas to an embodiment of a CNG system 10A that is optionally used for pressurizing field gas from field gas line 252. The discharge line 286 connects to a discharge of the CNG system 10A and carries the compressed field gas to an optional storage container 288 shown at a terminal end of discharge line 286. Pressure fill line 290 is shown connected to a discharge side of storage container 288 and is for carrying the compressed field gas to the transport vessel 280. In an example of operation, all of the field gas within feed line 271 may be directed through the CNG system 10A, where it is compressed and delivered in a compressed state into the transport vessel 280. In an alternate example, field gas at the pressure within field gas pipeline 254 can be directed into the transport vessel 280 via the free fill line 280, then at about the time when pressure in transport vessel reaches pressure within fuel gas pipeline 254, i.e. around 950 psig, then field gas in field line 271 can be diverted into CNG system 10A via lead line 284. Compressed gas from the CNG system 10A is then discharged through lines 286, 290 and into transport vessel 280 for filling the transport vessel 280 with compressed gas up to a pressure of about 4000 psig. As is known, the increasing field gas pressure in turn increases the mass of the field gas within transport vessel 280. An optional storage fuel line 292 is shown routed from free fill line 278, downstream of where lead line 284 branches from free fill line 278, and into the storage container 288. Thus examples exist wherein storage container 288 contains field gas at about the pressure of the field gas within the field gas pipeline 254, e.g 950 psig. Examples also exist where storage container 288 contains field gas at about the pressure of the field gas discharged from the CNG system 10A.

To facilitate the selective flow of field gas through lines 278, 284, 286, 290, 292, valves 294, 296, 298, 300 are shown respectively in lines 278, 286, 290, 292. The selective opening and closing of the valves 294, 296, 298, 300 is accomplished via a controller 302 shown in communication with valves 294, 296, 298, 300 and in communication with CNG system 10A. The communication between the controller 302 and these components is via communication links 304 that can be hard wired, as well as wireless. The controller may include an information handling system (IHS); where the IHS may include a processor, memory accessible by the processor, nonvolatile storage area accessible by the processor, a printed circuit board, and combinations thereof. The IHS may also optionally include logics for generating and sending signals to actuators (not shown) that command the actuator(s) to open (either fully or at a regulated amount for flow control) and/or close the valve(s).

In one example of operation, after the transport vessel 280 is filled to a designated capacity, the transport vehicle 282 can be used to move the transport vessel 280 to a region where gas consumers $306_{1-m}$, 308, are located for receiving the compressed gas. In the example of FIG. 13, gas consumers $306_{1-m}$ are shown located at the wellsites $270_{1-n}$ and may be devices that consume a compressed combustible gas, such as the field gas in the transport vessel 280. Optionally, consumers 308 exist that are proximate the fuel supply system 252, but not necessarily at a particular wellsite $270_{1-n}$. Example consumers $306_{1-m}$, 308 combust the field gas in order to operate machinery, such as an internal combustion engine, which can include any type of machine or vehicle modified to run on a field gas. Examples of the field gas include natural gas produced from the well 266. In one alternative, pressure in the field gas pipeline 254 ranges from around 900 psig to around 1200 psig. Another alternative embodiment, feed line 271 may connect directly to one or more of the wellhead assemblies 263, $269_1$, $269_{2-n}$.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. It should be pointed out that multiple of these modular units can be combined, such as in parallel, to meet a particular design operational flow requirement. Further, these units can be remotely monitored and controlled to optimize their performance. In an example, in response to an anticipated demand, production can be increased (thereby filling storage container 288) so that when the increased demand occurs, sufficient resources are available to meet the demand. These and other similar modifications will readily suggest themselves to those skilled in the art, and are intended to be encompassed within the spirit of the present invention disclosed herein and the scope of the appended claims.

What is claimed is:

1. A method of supplying combustible gas comprising:
   a. receiving gas from a field gas pipeline with a modular compressor that comprises a compressor package in a standardized shipping container, and that is proximate a wellsite;
   b. transferring gas from the field gas pipeline to a transport vessel; and
   c. compressing the gas with the modular compressor to form compressed gas.

2. The method of claim 1, further comprising dispensing the compressed gas in the transport vessel at the wellsite.

3. The method of claim 2, wherein the wellsite comprises a first wellsite and the location is proximate additional wellsites, the method further comprising dispensing the compressed gas in the transport vessel at a one of the additional wellsites.

4. The method of claim 1, further comprising moving the transport vessel from the wellsite.

5. The method of claim 1, wherein the compressor package comprises a compressor, a compressor driver, piping, and valves in the piping that are strategically oriented and located in the shipping container, so that locations of maintenance of the compressor, driver, piping, and valves are accessible through selectively opened access elements in sidewalls of the container.

6. The method of claim 1, wherein pressure in the field gas pipeline ranges from around 900 psig to around 1200 psig.

7. The method of claim 1, wherein the shipping container is an International Standards Organization (ISO) shipping container.

8. The method of claim 1, further comprising directing field gas from the field gas pipeline to the transport vessel, then directing the compressed gas into the transport vessel, wherein the field gas in the transport vessel is compressed by the compressed gas.

9. The method of claim 1, wherein the step of compressing gas in the transport vessel with the modular compressor comprises flowing field gas from the field gas pipeline to the modular compressor, compressing the field gas with the modular compressor to form compressed gas, and directing the compressed gas to the transport vessel, that in turn compresses gas in the transport vessel.

10. A method of supplying combustible gas comprising:
    a. receiving gas from a field gas pipeline in a transport vessel;
    b. receiving compressed gas in the transport vessel that is from the field gas pipeline, and which is compressed by a modular compressor at a location proximate the wellsite, and where the modular compressor comprises a compressor package disposed within a shipping container; and
    c. moving the transport vessel from the wellsite.

11. The method of claim 10, wherein the transport vessel is mounted on a vehicle.

12. The method of claim 11, wherein the wellsite comprises a first wellsite, further comprising, transporting the compressed gas in the transport vessel to a second wellsite that is proximate the first wellsite.

13. The method of claim 12, further comprising dispensing the compressed gas to a compressed gas user at the second wellsite.

14. The method of claim 10, wherein pressure at a discharge of the modular compressor is at about 4000 psig.

15. A system for providing combustible gas comprising:
    a modular compressor that comprises a compressor package in a standardized shipping container and that is disposed adjacent a field gas pipeline;
    a flow line that selectively flows field gas from the field gas pipeline to the modular compressor and that selectively flows the field gas to a transport vessel; and
    a discharge line having an end connected to a discharge of the modular compressor and to the transport vessel, so that when compressed field gas is discharged from the discharge of the modular compressor into the discharge line, the compressed field gas flows into and compresses field gas in the transport vessel.

16. The system of claim 15, further comprising valves in the flow line and the discharge line, and a controller for selectively opening and closing the valves in the flow line and the discharge line.

17. The system of claim 15, wherein the transport vessel is on a vehicle, so that the compressed field gas in the transport vessel is transportable to users of the compressed field gas that are located at a wellsite proximate the modular compressor.

\* \* \* \* \*